(12) United States Patent
Yu

(10) Patent No.: US 9,874,680 B2
(45) Date of Patent: Jan. 23, 2018

(54) CURVED DISPLAY DEVICE AND HOUSING THEREOF

(71) Applicant: NEW OPTICS, LTD., Yangju-si, Gyeonggi-do (KR)

(72) Inventor: Jae Myong Yu, Uijeongbu-si (KR)

(73) Assignee: NEW OPTICS, LTD., Yangju-si, Gyeonggi-do (KR)

( * ) Notice: Subject to any disclaimer, the term of this patent is extended or adjusted under 35 U.S.C. 154(b) by 54 days.

(21) Appl. No.: 14/907,768

(22) PCT Filed: Jan. 21, 2016

(86) PCT No.: PCT/KR2016/000680
§ 371 (c)(1),
(2) Date: Jan. 26, 2016

(87) PCT Pub. No.: WO2016/117953
PCT Pub. Date: Jul. 28, 2016

(65) Prior Publication Data
US 2016/0360628 A1    Dec. 8, 2016

(30) Foreign Application Priority Data
Jan. 21, 2015 (KR) .................. 10-2015-0009992

(51) Int. Cl.
*G02F 1/1333* (2006.01)
*F21V 8/00* (2006.01)
(52) U.S. Cl.
CPC ......... *G02B 6/0088* (2013.01); *G02B 6/0068* (2013.01)

(58) Field of Classification Search
CPC ............... G02B 6/0068; G02B 6/0088; G02F 1/133308; G02F 2001/133314
See application file for complete search history.

(56) References Cited

U.S. PATENT DOCUMENTS

| | | | |
|---|---|---|---|
| 6,552,761 B1* | 4/2003 | Seo ................... | G02F 1/133308 349/58 |
| 8,740,446 B2* | 6/2014 | Huang ................ | G02B 6/0088 362/632 |
| 9,323,084 B2* | 4/2016 | Lee ................... | G02F 1/133615 |
| 2013/0258251 A1* | 10/2013 | Lee ...................... | H05K 1/0209 349/69 |
| 2015/0116621 A1* | 4/2015 | Park .................. | G02F 1/133305 349/43 |
| 2017/0205658 A1* | 7/2017 | Jung ................. | G02F 1/133308 |

* cited by examiner

*Primary Examiner* — Peggy Neils
(74) *Attorney, Agent, or Firm* — Novick, Kim & Lee, PLLC; Jae Youn Kim

(57) ABSTRACT

The present invention relates to a curved display device and a housing thereof. A housing according to one aspect of the present invention includes a case top for covering a front surface of a curved display device; a cover bottom coupled to the case top and including a bottom surface section for covering a rear surface of the curved display device and a sidewall section having a linear sidewall extending from a linear edge of the bottom surface section and a curved sidewall extending from a curved edge of the bottom surface section; and a plurality of guide holders fitted with the curved sidewall of the cover bottom in a predetermined interval to fix a light guide plate arranged on the bottom surface section in a curved shape.

8 Claims, 7 Drawing Sheets

CURVED DISPLAY DEVICE AND HOUSING THEREOF

TECHNICAL FIELD

The present invention relates to a curved display device and a housing thereof, more particularly, to a curved display device and a housing thereof, which are configured to readily fix a light guide plate and a curved display panel.

BACKGROUND ART

Recently, the demand for design elements has been gradually increased in the field of flat panel displays (FPDs). In particular, since display articles have been utilized as interior decoration items, display articles having external appearance like picture frames have been launched in the market.

In match with the current tendency, recently, a curved display device including a curved display panel has been developed. When compared to the conventional display device, the curved display device has advantages in that the concentration degree and the three-dimensional effect can be improved when viewing the image.

When a conventional housing is adopted for the curved display device, curved protrusions are required in a guide frame or a cover bottom to fix a display panel or a light guide plate accommodated in a curved shape. However, a process for fabricating a housing component in a curved shape is very complex, so not only the productivity and the unit price of the display device may be deteriorated, but also the display panel or the light guide plate may not be property fixed, so that a great gap may occur when fixing the display panel or the light guide plate, and, in extreme case, the display panel or the light guide plate may be separated.

DISCLOSURE

Technical Problem

An object of the present invention is to provide a curved display device and a housing thereof, in which a light guide plate or a display panel provided in a curved shape can be fixed with a minimum gap.

Objects of the present invention may not be limited to the above, and other objects will be clearly understandable to those having ordinary skill in the art from the disclosures provided below together with accompanying drawings.

Technical Solution

According to one aspect of the present invention, there is provided a housing including a case top for covering a front surface of a curved display device; a cover bottom coupled to the case top and including a bottom surface section for covering a rear surface of the curved display device and a sidewall section having a linear sidewall extending from a linear edge of the bottom surface section and a curved sidewall extending from a curved edge of the bottom surface section; and a plurality of guide holders fitted with the curved sidewall of the cover bottom in a predetermined interval to fix a light guide plate arranged on the bottom surface section in a curved shape.

According to another aspect of the present invention, there is provided a curved display device including the housing.

Technical solutions of the present invention may not be limited to the above, and other technical solutions of the present invention will be clearly understandable to those having ordinary skill in the art from the disclosures provided below together with accompanying drawings.

Advantageous Effects

According to the present invention, the light guide plate or the display panel can be fixed with a minimum gap in a plurality of spots by using the guide holders which can be manufactured through a simple process.

Effects of the present invention may not be limited to the above, and other effects of the present invention will be clearly understandable to those having ordinary skill in the art from the disclosures provided below together with accompanying drawings.

BEST MODE

Mode for Invention

Figure 1:
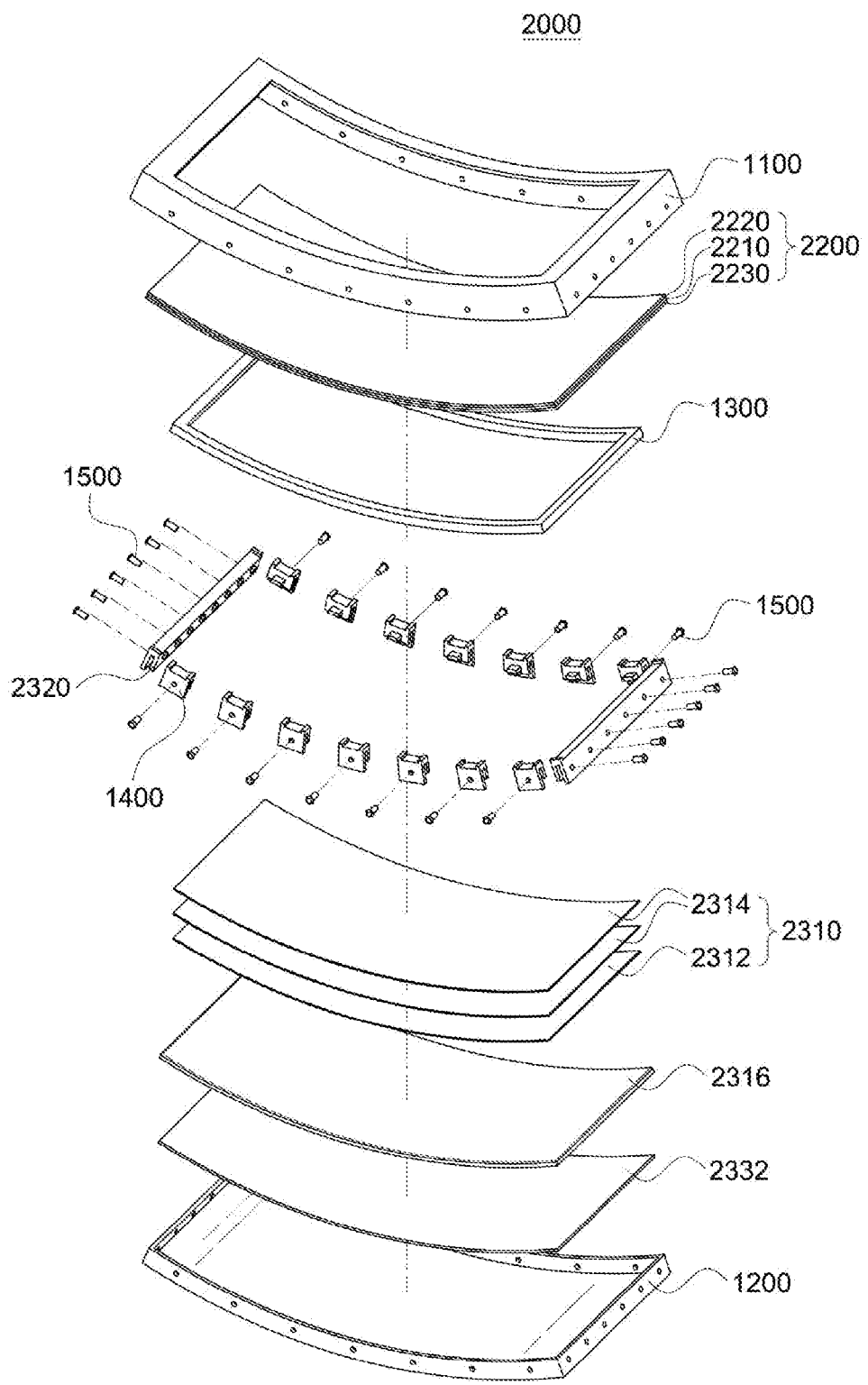
FIG. 1 is an exploded perspective view of a curved display device according to an embodiment of the present invention.

Embodiments described in this specification are made to clearly explain the scope of the invention to those having ordinary skill in the art, and do not intend to limit the present invention. It should be interpreted that the present invention may include substitutions and modifications within the technical scope of the present invention.

The terms used in this specification are selected from general terms, which are widely used currently, based on functions of components according to the embodiment of the present invention, and may have meanings varying according to the intentions of those skilled in the art, the custom in the field of art or advent of new technology. If a specific term is used with a specific meaning, the meaning of the term will be described specifically. Accordingly, the terms used in this specification should not be defined as simple names of the components, but be defined based on the actual meaning of the terms and the whole context throughout the present specification.

The accompanying drawings are to facilitate the explanation of the present invention and the shape in the drawings may be exaggerated for the purpose of convenience of explanation, so the present invention should not be limited to the drawings.

In addition, the details of the generally known function and structure, which make the subject matter of the present invention unclear, will be omitted.

According to one aspect of the present invention, there is provided a housing a case top for covering a front surface of a curved display device; a cover bottom coupled to the case top and including a bottom surface section for covering a rear surface of the curved display device and a sidewall section having a linear sidewall extending from a linear edge of the bottom surface section and a curved sidewall extending from a curved edge of the bottom surface section; and a plurality of guide holders fitted with the curved sidewall of the cover bottom in a predetermined interval to fix a light guide plate arranged on the bottom surface section in a curved shape.

In addition, the guide holder may include a body part having a "U" shape formed with an insertion groove into which the curved sidewall is inserted and a fixing part vertically extending from an inside of the body part and having a flat bottom surface making contact with the light guide plate to fix the light guide plate, and the fixing part may have a length equal to or less than a predetermined size such that a gap between the flat bottom surface and the curved light guide plate has a size less than a threshold value.

Further, the body part of the guide holder may include an outer sidewall arranged at an outer portion of the curved sidewall, an inner sidewall arranged at an inner portion of the curved sidewall, and a flat upper wall arranged at an upper end of the curved sidewall to connect the outer sidewall to the inner sidewall, and the body part may have a length equal to or less than a predetermined size such that a gap between the flat upper wall and an upper end of the sidewall has a size less than a threshold value.

The housing may further include a panel guide in a form of a picture frame for guiding the curved display panel, and a top surface of the fixing part of the guide holder may make contact with a bottom surface of the panel guide to support the panel guide.

The curved display device may have a radius of curvature in a range of 3000 mm to 7000 mm.

Further, five to ten guide holders may be arranged at a pair of curved sidewalls, respectively.

In addition, the housing may further include a light source array, and the light source array may have a "U" shape formed with a fixing groove and may be arranged on the cover bottom such that the linear sidewall is inserted into the fixing groove.

The light source array may include an outer sidewall arranged at an outer portion of the linear sidewall, an inner sidewall arranged at an inner portion of the linear sidewall, and an upper wall arranged at an upper end of the linear sidewall to connect the outer sidewall to the inner sidewall, and the light source array is fixed to the cover bottom by a fastening member screw-coupled into through holes formed in the linear sidewall, the inner sidewall and the outer sidewall.

According to another aspect of the present invention, there is provided a curved display device including the housing.

Hereinafter, a curved display device 2000 according to an embodiment of the present invention will be described. The curved display device 2000 should be inclusively construed as the concept including all of various curved display devices 2000 that outputs an image, such as an LCD curved display device, a PDP curved display device, and an OLED curved display device. For the purpose of convenience of explanation, the LCD curved display device will be described as an example of the curved display device 2000.

FIG. 1 is an exploded perspective view of the curved display device 2000 according to an embodiment of the present invention.

Referring to FIG. 1, the curved display device 2000 may include a housing 1000, a curved display panel 2200, and a backlight unit 2300.

The housing 1000 receives the curved display panel 2200 and the backlight unit 2300 therein to protect the curved display panel 2200 and the backlight unit 2300 from external impact. In addition, the housing 1000 has a function of matching the curved display panel 2200 with the backlight unit 2300.

The housing 1000 may include a case top 1100, a panel guide 1300, guide holders 1400, and a cover bottom 1200. The case top 1100 is coupled with the cover bottom 1200 to cover front and rear surfaces of the curved display device 2000, respectively, the panel guide 1300 is interposed between an optical sheet 2310 and the curved display panel 2200 such that the optical sheet 2310 and the curved display panel 2200 are spaced apart from each other, and the guide holders 1400 are fitted with a sidewall section 1220 of the cover bottom 1200. The guide holders 1400 fix a light guide plate 2316, the panel guide 1300 and the curved display panel 2200.

The curved display panel 2200 displays an image by using light supplied from the backlight unit 2300.

The curved display panel 2200 may include two transparent substrates and a liquid crystal layer 2210 interposed between the two transparent substrates. The two transparent substrates may include a color filter 2230 and a thin film transistor (TFT) substrate 2220. As an electric signal is applied to the liquid crystal layer 2210 through gate lines and data lines of the TFT substrate 2220, the alignment of liquid crystal is changed such that the light output from the backlight unit 2300 is selectively transmitted in units of pixels and the light transmitted through the liquid crystal is colored by the color filter substrate 2230, so that the color image is output. The TFT substrate 2220 may be electrically connected to a panel driving unit (not shown), such as a chip on film (COF) or tape carrier package (TCP), through a printed circuit board (PCB; not shown) to receive control signals.

The light guide plate 2316 may be disposed to face the rear portion of the curved display panel 2200 in the edge type backlight unit 2300. The light guide plate 2316 may guide light, which is output in the lateral direction from a light source 2326, toward the curved display panel 2200. In addition, patterns may be formed on top and bottom surfaces of the light guide plate 2316 and a side surface of the light guide plate 2316 adjacent to the light source 2326, respectively, to improve brightness and hot spot phenomenon. The light guide plate 2316 may be formed of poly methyl methacrylate (PMMA), MS or MMA. Details of the light guide plate 2316 will be described later. Meanwhile, in the case of a direct-illumination type backlight unit 2300, a diffusion plate may be provided in order to diffuse the light instead of the light guide plate 2316 for guiding the light.

The backlight unit 2300 may supply the light to the rear portion of the curved display panel 2200 to allow the curved display panel 2200 to display the image.

The backlight unit 2300 may include a light source array 2320, the optical sheet 2310 and the light guide plate 2316.

The light source array 2320 may include the light source 2326 for generating the light and a light source substrate 2324 on which the light source 2326 is mounted. The light source 2326 may include a cold cathode fluorescent lamp (CCFL), an external electrode fluorescent lamp (EEFL), or a light emitting diode (LED). In the case of an edge type backlight unit 2300, the light source array 2320 may be installed at a peripheral portion of the curved display device 2000 such that the light source 2326 faces a lateral side so that light is input to an incident surface of the light guide plate 2316. The light source 2326 may be installed in the cover bottom 1200, or the light source 2326 may be directly installed in the cover bottom 1200 while the light source substrate 2324 is omitted.

The optical sheet 2310 is disposed on the rear side of the curved display panel 2200 to face the curved display panel 2200, and, when the light guide plate 2316 is present, may be disposed between the curved display panel 2200 and the light guide plate 2316. An example of the optical sheet 2310 may be a diffusion sheet 2314 or a prism sheet 2312. The diffusion sheet 2314 uniformly diffuses light output from the light guide plate 2316 or the diffusion plate to improve the uniformity of the light output distribution and alleviate or eliminate a dark/bright pattern such as a Moire phenomenon or a hot spot. The prism sheet 2312 may adjust the path of the light to a direction perpendicular to the curved display panel 2200. The light that passed through the light guide plate 2316 or the diffusion sheet 2314 is disposed in all directions, and the prism sheet 2312 may output the diffused light in a direction perpendicular to the curved display panel 2200 to improve the luminance and angle of view of the curved display device 2000. According to an example, as illustrated in FIG. 1, the optical sheet 2310 may be configured such that a vertical prism sheet 2312, a horizontal prism sheet 2312, and the diffusion sheet 2314 are sequentially disposed from a side close to the curved display panel 2200. The arrangement sequence of the optical sheets 2310 is not necessarily limited to the above-mentioned example. In other words, some of the optical sheets 2310 may be omitted, several sheets may be disposed (for example, two or more diffusion sheets 2314 may be disposed), or the sequence may be suitably changed according to occasions.

A reflective sheet 2332 may be attached to the cover bottom 1200. The reflective sheet 2332 may reflect the light output from the light source 2326, which proceeds to the rear side, towards the curved display panel 2200. The reflective sheet 2332 may reflect the light, which is output through the light guide plate 2316 or the rear surface of the diffusion plate, towards the curved display panel 2200 to reduce optical loss, thereby improving display luminance.

Hereinafter, the housing 1000 according to the embodiment of the present invention will be described in detail.

Figure 2:
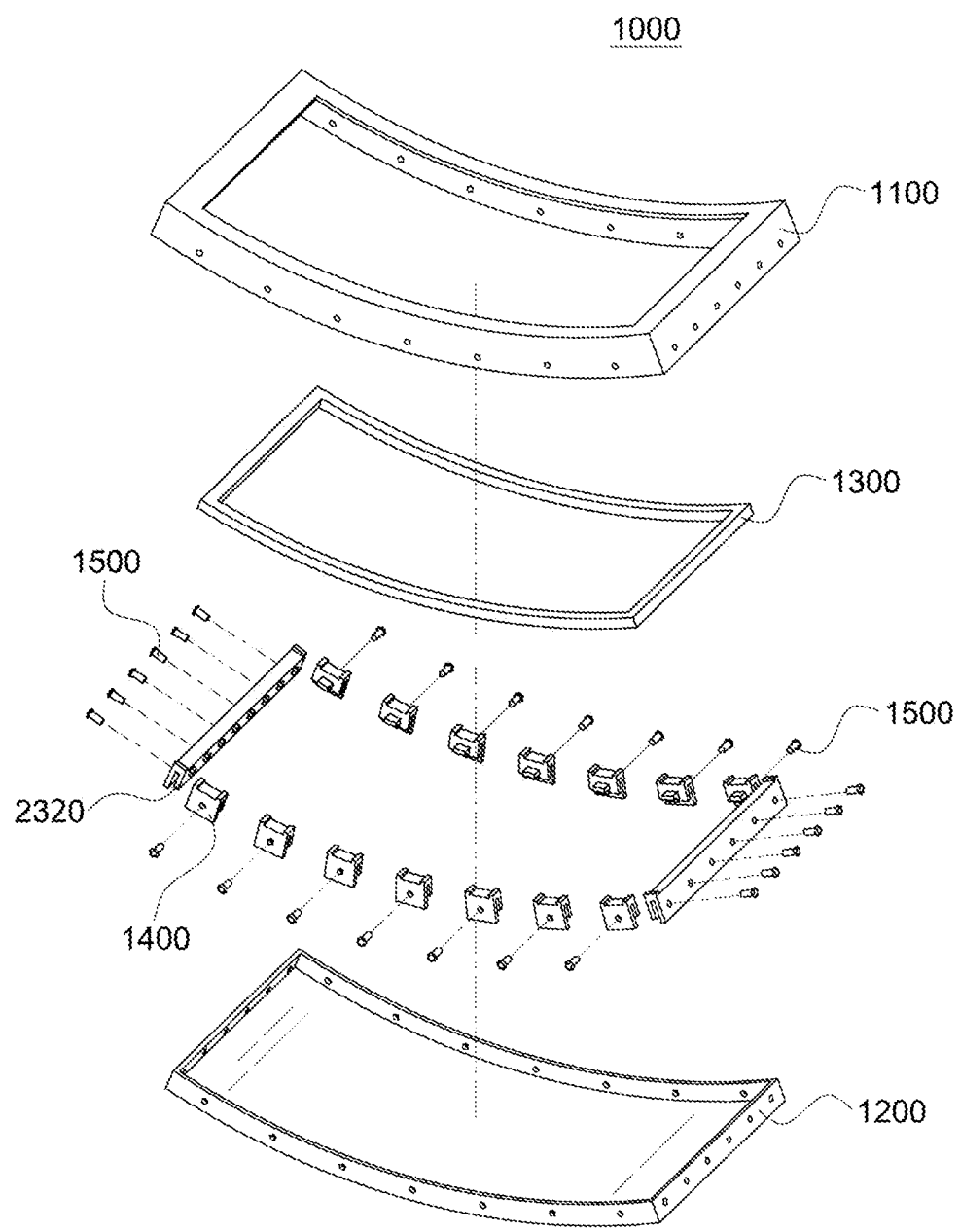
FIG. 2 is an exploded perspective view of a housing according to an embodiment of the present invention.

FIG. 2 is an exploded perspective view of a housing 1000 according to the embodiment of the present invention.

Referring to FIG. 2, the housing 1000 may include a case top 1100, a panel guide 1300, guide holders 1400 and a cover bottom 1200.

The case top 1100 may cover a front periphery of the curved display panel 2200. The shape of the case top 1100 may vary depending on the shape of the curved display device 2000 and a narrow bezel type curved display device 2000 may have a narrow-width bezel that covers the front periphery of the curved display panel 2200. According to occasions, the case top 1100 may rarely have the bezel or have no bezel.

The center of the panel guide 1300 may be open in the form of a picture frame. The panel guide 1300 may be rested on the guide holders 1400 to be described later such that the optical sheet 2310 is spaced apart from the curved display panel 2200.

The cover bottom 1200 may cover the rear surface of the curved display device 2000, and may be accommodated in the case top 1100.

The cover bottom 1200 may include a bottom surface section 1240 and a sidewall section 1220. The cover bottom 1200 may have a box shape in which an upper portion is opened.

The bottom surface section 1240 may be provided in the form of a plate that faces the rear surface of the curved display panel 2200, and corresponds to the bottom of the box shape. In this case, the bottom surface section 1240 may have a curved surface having a radius of curvature similar to a radius of curvature of the curved display panel 2200. The radius of curvature of the curved display panel 2200 may be in the range of 3000 mm to 7000 mm and the radius of curvature may be property changed according to the size of the curved display device 2000. Thus, edges of the bottom surface section 1240 may include linear edges formed at left and right sides of the curved surface and curved edges formed at upper and lower portions of the curved surface.

The sidewall section 1220 extends in the forward direction from the edges of the bottom surface section 1240 and may include a linear sidewall 1222 and a curved sidewall 1224.

The linear sidewall 1222 may extend forward from the linear edge of the bottom surface section 1240 and may be formed at both ends of the bottom surface section 1240 lengthwise along the bottom surface section 1240. The light source array 2320 may be installed on the linear sidewall 1222.

The curved sidewall 1224 may extend forward from the curved edge of the bottom surface section 1240 and may be formed at both ends of the bottom surface section 1240 widthwise along the bottom surface section 1240. In addition, the curved sidewall 1224 may extend to have a predetermined height and may have a radius of curvature similar to that of the curved display panel 2200. The guide holders 1400 to be described later may be fitted with the curved sidewall 1224.

The guide holders 1400 may fix the light guide plate 2316 and the panel guide 1300. The guide holder 1400 may include a body part 1420 and a fixing part 1440.

The body part 1400 is fitted with the curved sidewall 1224 and the fixing part 1440 is inserted between the light guide plate 2316 and the panel guide 1300 so that the light guide plate 2316, the panel guide 1300 and the curved display panel 2200 are fixed between the case top 1100 and the cover bottom 1200. At this time, the guide holders 1400 may be fixed as fastening members 1500 are screw-coupled into through holes H formed at one side of the holders 1400.

Figure 3:
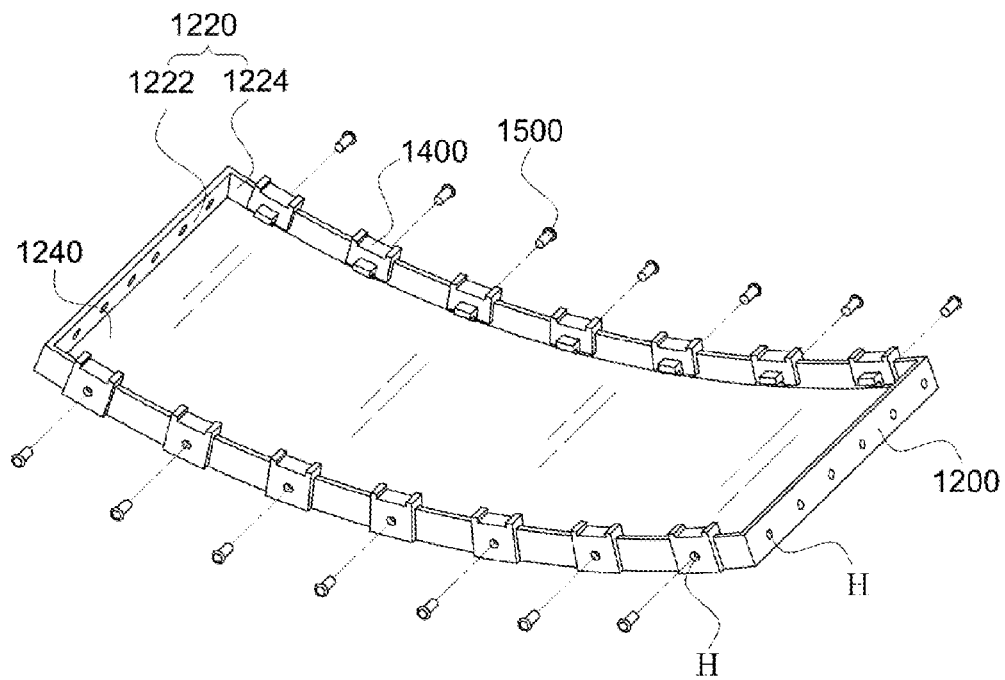
FIG. 3 is a perspective view of a cover bottom equipped with a guide holder according to an embodiment of the present invention.

FIG. 3 is a perspective view of the cover bottom 1200 equipped with the guide holders 1400 according to an embodiment of the present invention.

Referring to FIG. 3, five to ten guide holders 1400 may be installed at a regular interval along a pair of curved sidewalls 1224. The number of the guide holders 1400 may vary depending on the size of the curved display panel 2200 and it is also possible to install more than ten guide holders 1400 or less than five holders 1400.

Meanwhile, the guide holders 1400 may be installed on the linear sidewall 1220 where the light source array 2320 is not installed.

Hereinafter, the guide holders 1400 will be described in more detail.

Figure 4:
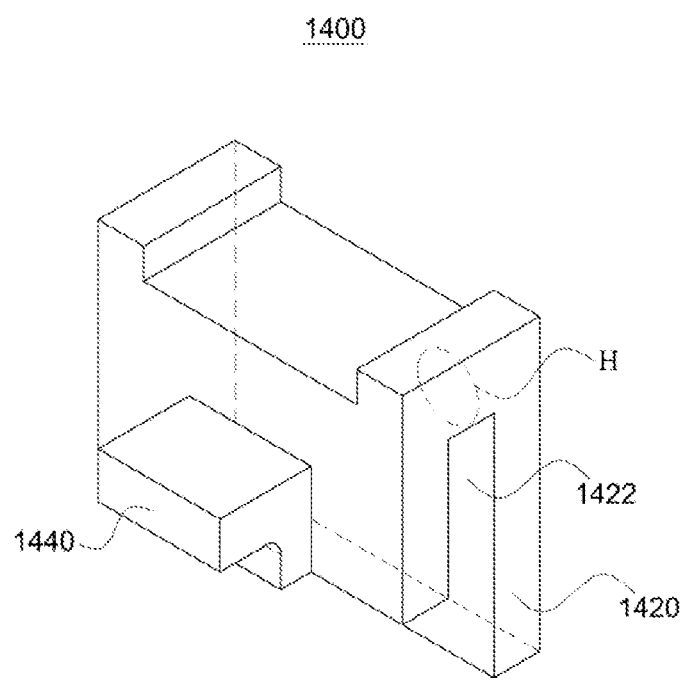
FIG. 4 is a perspective view of a guide holder according to an embodiment of the present invention.
Figure 5:
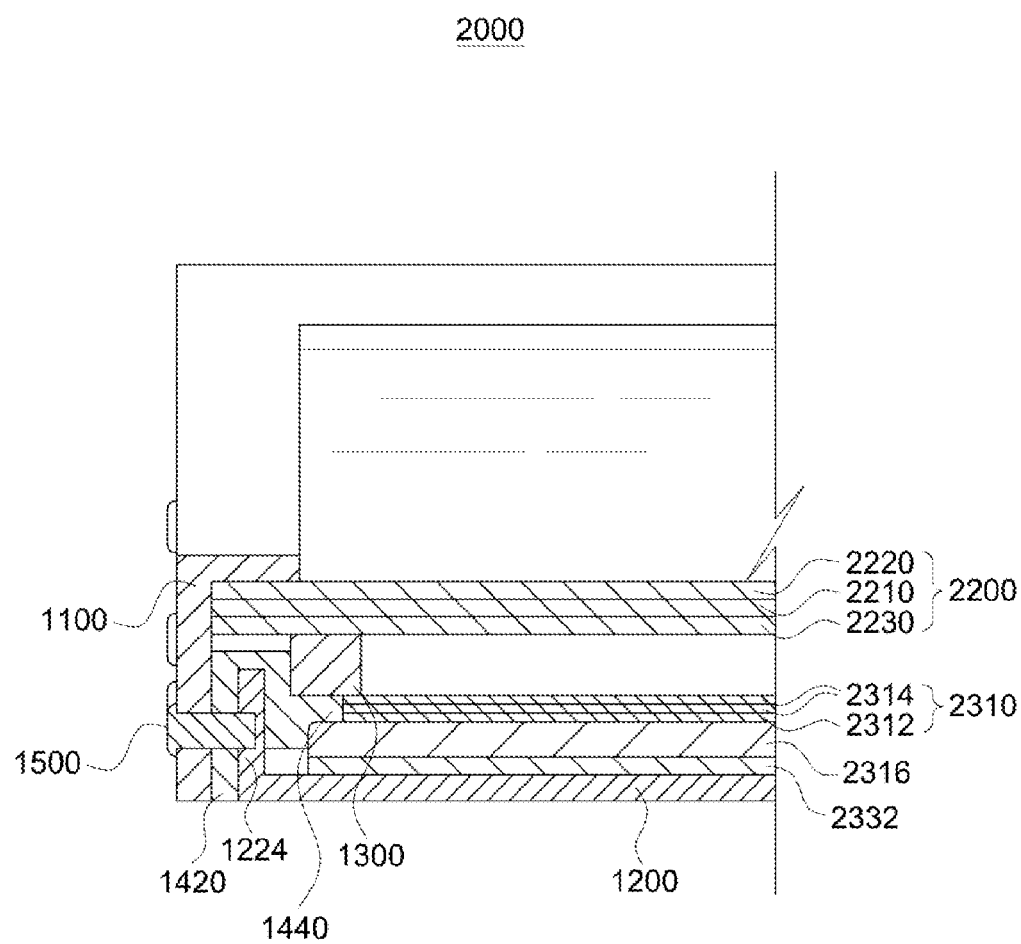
FIG. 5 is a longitudinal sectional view of a curved display device according to an embodiment of the present invention.
Figure 6:
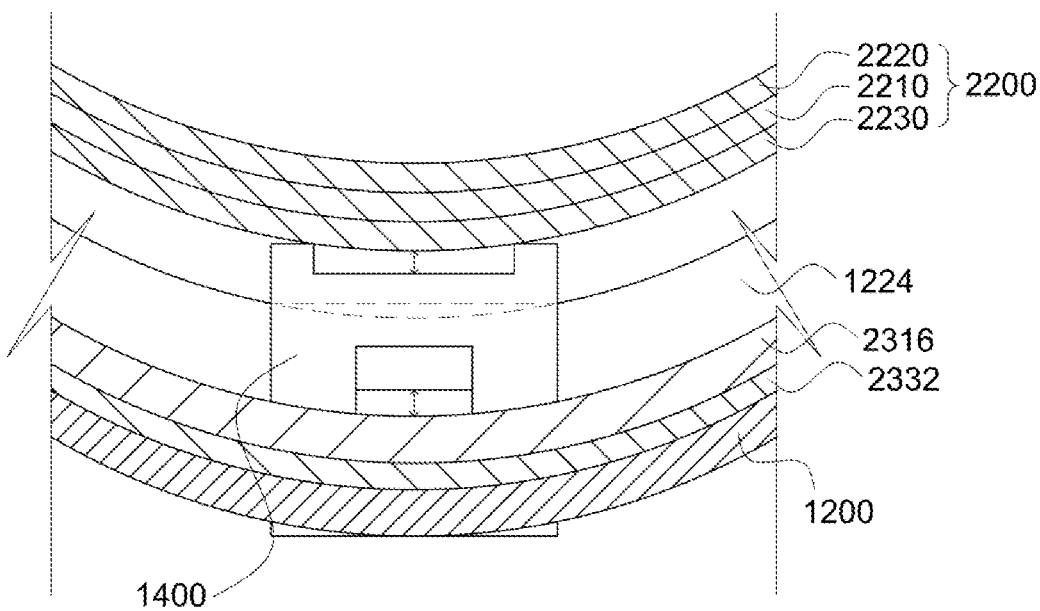
FIG. 6 is a front view of a guide holder inserted into a cover bottom and a light guide plate according to an embodiment of the present invention.

FIG. 4 is a perspective view of the guide holder 1400 according to an embodiment of the present invention, FIG. 5 is a longitudinal sectional view of the curved display device 2000 according to an embodiment of the present invention and FIG. 6 is a front view of the guide holder 1400 inserted into the curved display panel 2200 and the light guide plate 2316 according to an embodiment of the present invention.

Referring to FIG. 4, the guide holder 1400 may include the body part 1420 and the fixing part 1440.

The body part 1420 may include an outer sidewall having an "U" shape and arranged at an outer portion of the curved sidewall 1224 of the cover bottom 1200, an inner sidewall arranged at an inner portion of the curved sidewall 1224, and a flat upper wall arranged at an upper end of the curved sidewall 1224 to connect the outer sidewall to the inner sidewall. In addition, the body part 1420 may be formed with an insertion groove 1422 having an open lower portion. The insertion groove 1422 may have a width corresponding to a thickness of the curved sidewall 1224 of the cover bottom 1200 so that the curved sidewall 1224 may be inserted into the insertion groove 1422. That is, the insertion groove 1422 may have a long rectangular shape extending along the curved sidewall 1224 and a depth of the insertion groove 1422 may be shallower than a height of the curved sidewall 1224.

In addition, a through hole H may be formed in the body part 1420. The fastening member 1500 is inserted into the through hole H to fix the case top 1100, the guide holder 1400 and the cover bottom 1200. The fastening member 1500 is screw-coupled into the through hole H so that the case top 1100, the guide holder 1400 and the cover bottom 1200 are sequentially fixed.

The fixing part 1440 may protrude to an inside of the cover bottom 1200 from an inner sidewall of the body part 1420 and a lower portion of the fixing part 1440 may be stepped to have a shape corresponding to an edge of the light guide plate 2316. The fixing part 1440 may have a height enough to make contact with the top surface of the light guide plate 2316 and the fixing part 1440 may fix the light guide plate 2316 by making contact with the light guide plate 2316 in the direction of the bottom surface section 1240. The panel guide 1300 may be mounted on the top surface of the fixing part 1440 and the fixing part 1440 may have a thickness sufficient for supporting the light guide plate 2316 and the panel guide 1300.

Referring to FIG. 5, the curved display panel 2200 and the backlight unit 2300 may be interposed between the case top 1100 and the cover bottom 1200.

The reflective sheet 2332 and the light guide plate 2316 may be mounted on the bottom surface section 1240 of the cover bottom 1200, or the light guide plate 2316 may be solely mounted on the bottom surface section 1240 of the cover bottom 1200 without the reflective sheet 2332.

After the light guide plate 2316 is mounted on the bottom surface section 1240 of the cover bottom 1200, the insertion groove 1422 of the guide holder 1400 is fixedly fitted with the curved sidewall 1224 of the cover bottom 1200. In this case, the bottom surface of the stepped fixing part 1440 of the guide holder 1400 may adhere to the light guide plate 2316 while pressing the light guide plate 2316, so that the light guide plate 2316 may be fixed. In addition, the optical sheet 2310 may be mounted on the top surface of the light guide plate 2316.

A plurality of guide holders 1400 may be installed at a regular interval along the curved sidewall 1224 of the cover bottom 1200. Preferably, five to ten guide holders 1400 are installed along the curved sidewall 1224. The number of the guide holders 1400 may vary depending on the size of the curved display panel 2200 and it is also possible to install more than ten guide holders 1400 or less than five holders 1400. In addition, the interval of the guide holders 1400 may vary depending on the radius of curvature of the curved display panel 2200.

The panel guide 1300 may be fixedly mounted on the top surface of the fixing part of the guide holder 1400 and the optical sheet 2310 may be spaced apart from the curved display panel 2200 by the panel guide 1300.

After the backlight unit 2300 is fixed by the guide holder 1400, the display panel 2200 may be mounted on the top surface of the upper wall of the body part 1420 of the guide holder 1400. The top surface of the display panel 2200 mounted on the upper wall of the guide holder 1400 may come into contact with the bottom surface of the case top 1100 and may be fixed between the case to 1100 and the guide holder 1400. The case top 1100 may be configured such that the curved sidewall 1224 of the cover bottom 1200 and the outer portion of the guide holder 1400 may be accommodated in the case to 1100. In addition, a through hole H may be formed in the case top 1100 and the curved sidewall 1224 of the cover bottom 1200 corresponding to the position and size of the through hole H formed in the outer sidewall of the guide holder 1400. The fastening member 1500 is screw-coupled into the through hole H so that the case top 1100, the guide holder 1400 and the cover bottom 1200 may be fixed.

Meanwhile, referring to FIG. 6, a predetermined gap may be formed among the guide holder 1400, the cover bottom 1200 and the light guide plate 2316. In detail, the gap may be formed between the upper wall of the body part 1420 of the guide holder 1400 and the upper end of the curved sidewall 1224. The gap may also be formed between the bottom surface of the fixing part 1440 and the top surface of the light guide plate 2310. Meanwhile, the gap formed among the guide holder 1400, the cover bottom 1200 and the light guide plate 2316 is exaggerated in FIG. 6 for the purpose of convenience of explanation. Actually, the gap may be rarely formed among the guide holder 1400, the cover bottom 1200 and the light guide plate 2316. In addition, since the light guide plate 2316 is formed of a flexible material, the light guide plate 2316 may adhere to the guide holder 1400 due to the press force of the guide holder 1400 when the guide holder 1400 is installed, so that the gap may not be formed between the guide holder 1400 and the light guide plate 2316.

In order to diminish the gap formed among the guide holder 1400, the cover bottom 1200 and the light guide plate 2316, the guide holder 1400 having a length equal to or less than a predetermined length is preferably installed. For example, if the guide holder 1400 has a length longer than the predetermined length, the flat section of the guide holder 1400 may be increased, so that the gap among the guide holder 1400, the cover bottom 1200 having the curved surface and the light guide plate 2316 may be enlarged. If the gap among the guide holder 1400, the cover bottom 1200 having the curved surface and the light guide plate 2316 is enlarged, pressure applied to the guide holder 1400 may be increased so that the guide holder 1400 may be broken and the radius of curvature of the curved display device 2000 may be changed, causing quality degradation in the image display on the curved display panel 2200.

Figure 7:
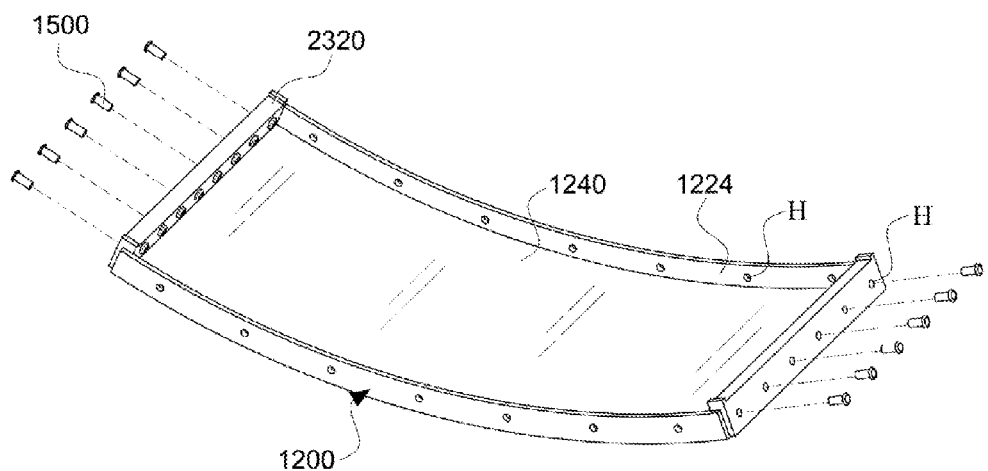
FIG. 7 is a perspective view of a cover bottom equipped with a light source array according to an embodiment of the present invention.
Figure 8:
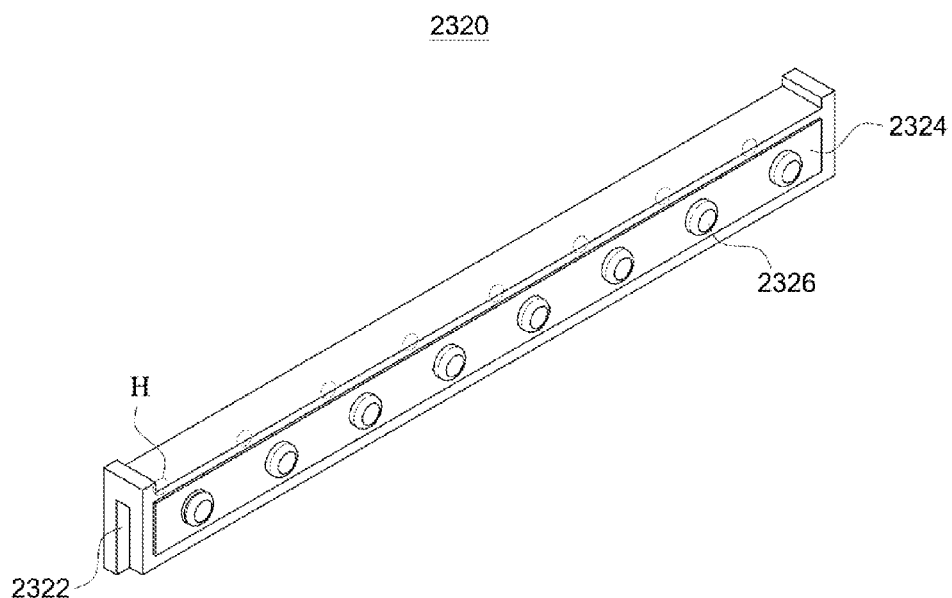
FIG. 8 is a perspective view of a light source array according to an embodiment of the present invention.
Figure 9:
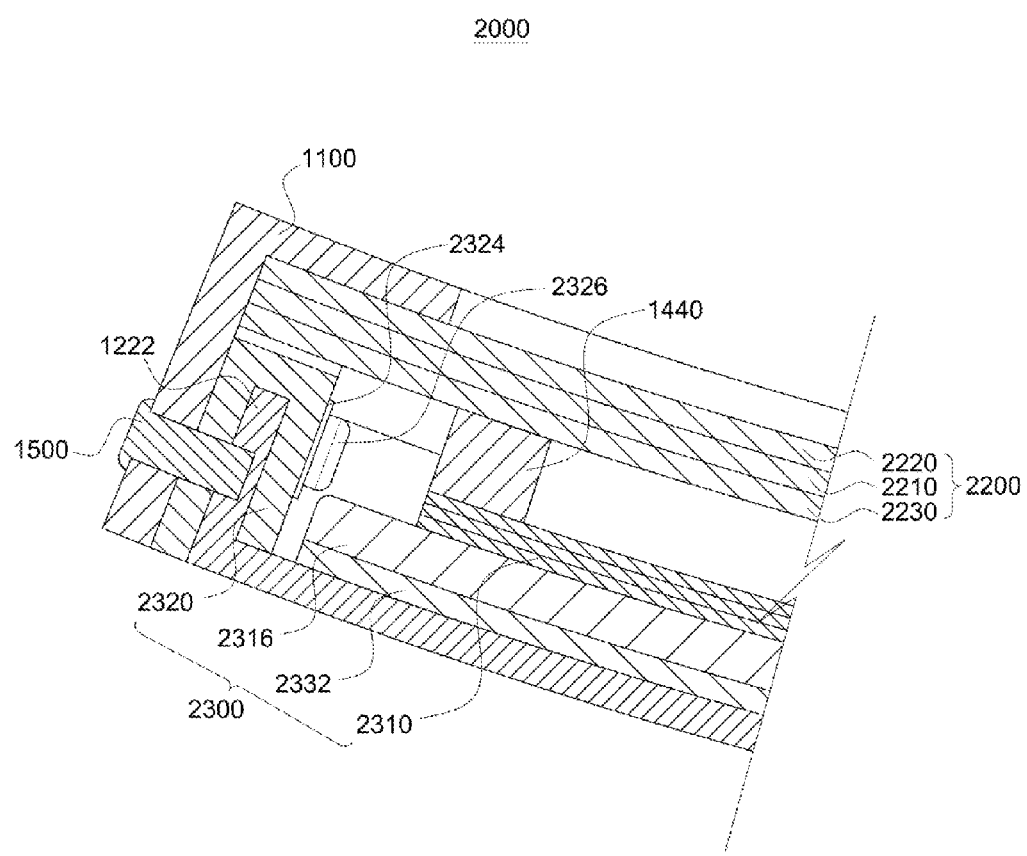
FIG. 9 is a cross sectional view of a curved display device according to an embodiment of the present invention.

FIG. 7 is a perspective view of the cover bottom 1200 equipped with the light source array 2320 according to an embodiment of the present invention, FIG. 8 is a perspective view of the light source array 2320 according to an embodiment of the present invention and FIG. 9 is a cross sectional view of the curved display device 2000 according to an embodiment of the present invention.

Referring to FIG. 7, the light source array 2320 may be installed on the linear sidewall 1222 of the cover bottom 1200. In detail, the light source array 2320 may be installed on both linear sidewalls 1222 of the cover bottom 1200 or one linear sidewall 1222 of the cover bottom 1200 depending on the position of a light incident surface of the light guide plate 2316.

Referring to FIG. 8, the light source substrate 2324 and the light source 2326 may be installed on the light source array 2320.

The light source array 2320 may be configured in a "U" shape having a fixing groove 2322 which is long in the longitudinal direction and a lower portion of which is open. The fixing groove 2322 may have a depth equal to or lower than a height of the linear sidewall. In addition, the light source array 2320 may include an outer sidewall arranged at an outer portion of the linear sidewall 1222, an inner sidewall arranged at an inner portion of the linear sidewall 1222, and an upper wall arranged at an upper end of the linear sidewall 1222 to connect the outer sidewall to the inner sidewall. In addition, a through hole H may be formed in the outer sidewall and the fastening member 1500 may be inserted into the through hole H. The light source substrate 2324 may be installed on the inner sidewall and a plurality of light sources 2326 may be installed on the light source substrate 2324 at a predetermined interval.

A width of the light source array 2320 may vary depending on the cover bottom 1200 and the light guide plate 2316 and the number of the light sources 2326 installed on the light source array 2320 may vary depending on the size of the curved display device 2000.

Referring to FIG. 9, the light source array 2320 may be fixedly inserted into the linear sidewall 1222 of the cover bottom 1200 such that the light source 2326 may face the light guide plate 2316. The light source array 2320 may also be installed on both linear sidewalls 1222 of the cover bottom 1200 depending on the size of the curved display device 2000. In addition, a through hole H may be formed in the case top 1100 and the linear sidewall 1222 of the cover bottom 1200 corresponding to the position and size of the through hole H formed in the outer sidewall of the light source array 2320. The fastening member 1500 may be screw-coupled into the through hole H to fix the case top 1100, the light source array 2320 and the cover bottom 1200.

The above description is to simply illustrate the technical scope of the present invention and various modifications and substitutions can be made by those skilled in the art without departing from the scope of the present invention. Therefore, the embodiments of the present invention described above may be implemented independently or in combination with each other.

Therefore, the embodiments disclosed in the present invention do not intend to limit the technical scope of the present invention, but to explain the present invention, and the technical scope of the present invention will not be limited by the embodiments, but shall be interpreted as defined in the claims. All technical scopes within the scope of the claims should be interpreted to be included within the scope of the present invention.

The invention claimed is:

1. A housing comprising:
    a case top for covering a front surface of a curved display device;
    a cover bottom coupled to the case top and including a bottom surface section for covering a rear surface of the curved display device and a sidewall section having a linear sidewall extending from a linear edge of the bottom surface section and a curved sidewall extending from a curved edge of the bottom surface section; and
    a plurality of guide holders fitted with the curved sidewall of the cover bottom in a predetermined interval to fix a light guide plate arranged on the bottom surface section in a curved shape,
    wherein each of the plurality of guide holders includes a body part having a "U" shape formed with an insertion groove into which the curved sidewall is inserted and a fixing part vertically extending from an inside of the body part and having a flat bottom surface making contact with the light guide plate to fix the light guide plate, and the fixing part has a length equal to or less than a predetermined size such that a gap between the flat bottom surface and the curved light guide plate has a size less than a threshold value.

2. The housing of claim 1, wherein the body part includes an outer sidewall arranged at an outer portion of the curved sidewall, an inner sidewall arranged at an inner portion of the curved sidewall, and a flat upper wall arranged at an upper end of the curved sidewall to connect the outer sidewall to the inner sidewall, and the body part has a length equal to or less than a predetermined size such that a gap between the flat upper wall and an upper end of the sidewall has a size less than a threshold value.

3. The housing of claim 1, further comprising a panel guide in a form of a picture frame for guiding the curved display panel, wherein a top surface of the fixing part of the guide holder makes contact with a bottom surface of the panel guide to support the panel guide.

4. The housing of claim 1, wherein the curved display device has a radius of curvature in a range of 3000 mm to 7000 mm.

5. The housing of claim 1, wherein five to ten of the plurality of guide holders are arranged at a pair of curved sidewalls, respectively.

6. The housing of claim 1, further comprising a light source array, wherein the light source array has a "U" shape formed with a fixing groove and is arranged on the cover bottom such that the linear sidewall is inserted into the fixing groove.

7. The housing of claim 6, wherein the light source array includes an outer sidewall arranged at an outer portion of the linear sidewall, an inner sidewall arranged at an inner portion of the linear sidewall, and an upper wall arranged at an upper end of the linear sidewall to connect the outer sidewall to the inner sidewall, and the light source array is fixed to the cover bottom by a fastening member screw-coupled into through holes formed in the linear sidewall, the inner sidewall and the outer sidewall.

8. A curved display device including the housing claimed in claim 1.

* * * * *